United States Patent
Guduru et al.

(10) Patent No.: US 7,349,353 B2
(45) Date of Patent: Mar. 25, 2008

(54) TECHNIQUES TO REDUCE ECHO

(75) Inventors: Vijayakrishna Prasad Guduru, Morris Plains, NJ (US); Hyung W. Paik, Morris Plains, NJ (US)

(73) Assignee: Intel Corporation, Santa Clara, CA (US)

( * ) Notice: Subject to any disclaimer, the term of this patent is extended or adjusted under 35 U.S.C. 154(b) by 726 days.

(21) Appl. No.: 10/729,177

(22) Filed: Dec. 4, 2003

(65) Prior Publication Data

US 2005/0122893 A1 Jun. 9, 2005

(51) Int. Cl.
*H04B 3/20* (2006.01)
(52) U.S. Cl. .................. 370/286; 379/406.01
(58) Field of Classification Search ............ None
See application file for complete search history.

(56) References Cited

U.S. PATENT DOCUMENTS

| 5,663,955 | A  | * | 9/1997  | Iyengar ............... 370/291 |
| 6,980,646 | B1 | * | 12/2005 | Demirekler et al. ... 379/406.08 |
| 2003/0053617 | A1 | * | 3/2003 | Diethorn .............. 379/406.01 |

OTHER PUBLICATIONS

International Telecommunication Union, Telecommunication Standardization Sector (ITU-T), "Digital Network Echo Cancellers, Series G: Transmission Systems and Media, Digital Systems and Networks, International Telephone Connections and Circuits—Apparatus Associated with Long-Distance Telephone Circuits", ITU-T Recommendation G.168, Apr. 2000.

* cited by examiner

*Primary Examiner*—Ramnandan Singh
(74) *Attorney, Agent, or Firm*—Caven & Aghevli LLC

(57) ABSTRACT

Briefly, techniques to control echo that utilize fixed and adaptive filters are described.

24 Claims, 4 Drawing Sheets

TECHNIQUES TO REDUCE ECHO

FIELD

The subject matter disclosed herein generally relates to techniques to control echo.

DESCRIPTION OF RELATED ART

It is well known that in many communications systems, transmission of signals between a transmitter and a receiver generates noise arising from signal reflection from at least impedance mismatching and interface points (so called "echo"). Consequently, echo often corrupts the signal quality of a transmitted signal so that the receiver cannot accurately reproduce the signal. Echo cancellers can be used to control echo.

BRIEF DESCRIPTION OF THE DRAWINGS

Note that use of the same reference numbers in different figures indicates the same or like elements.

DETAILED DESCRIPTION

Figure 1:
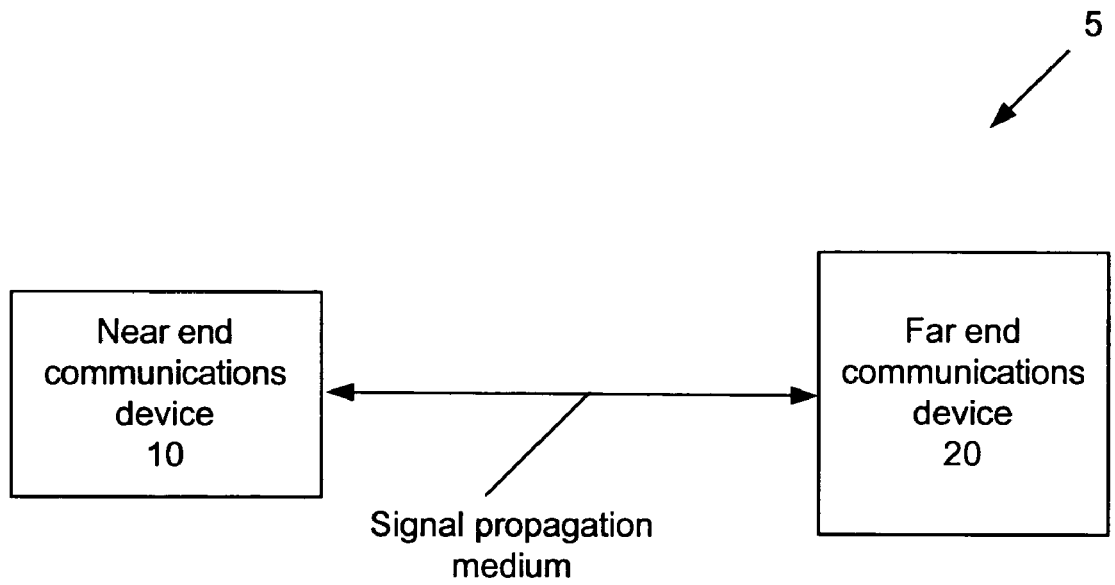
FIG. 1 depicts in block diagram format a communications system.

FIG. 1 depicts in block diagram format a communications system 5. Near end communications device 10 and far end communications device 20 may communicate using a signal propagation medium such as a full duplex line, twisted pair telephone line, coaxial cable, fiber optic cable, or wireless techniques. For example, near end communications device 10 may provide communications capabilities of a telephone such as a speaker to generate sound based on a signal received from far end communications device 20 and also include a microphone to receive sound from a user of near end communications device 10. Near end communications device 10 may use some embodiments of the present invention. For example, far end communications device 20 may provide communications capabilities of a central office in a telephonic communications system.

Figure 2:
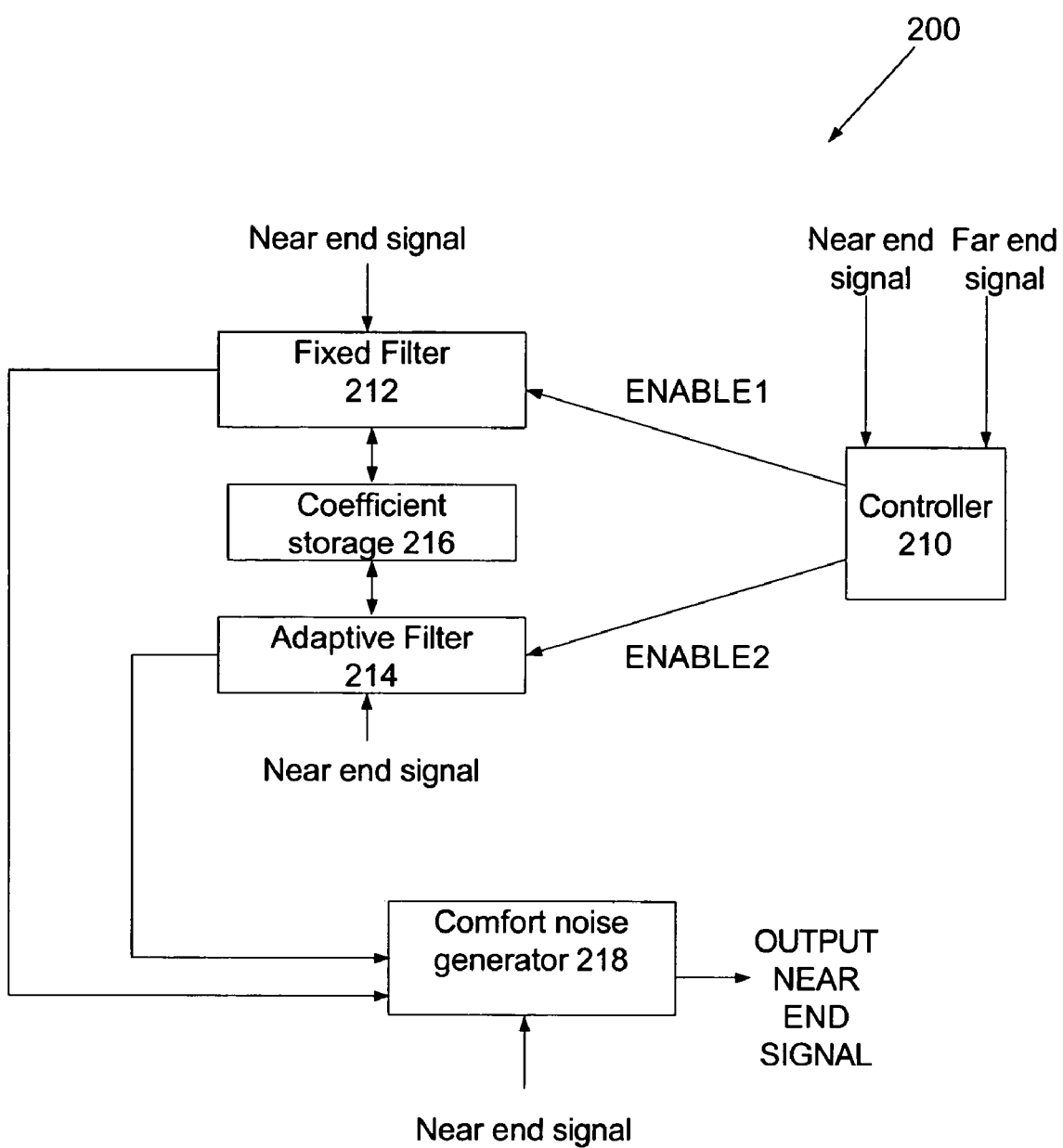
FIG. 2 depicts one possible implementation of an echo canceller in accordance with an embodiment of the present invention.

FIG. 2 depicts one possible implementation of echo canceller 200 in accordance with an embodiment of the present invention, although other implementations may be used. Echo canceller 200 may include controller 210, fixed filter 212, adaptive filter 214, coefficient storage 216, and comfort noise generator 218. A far end signal can be a signal transmitted by the device that uses echo canceller 200 (e.g., a data or voice signal) to a far end modem. A near end signal can be a signal received from a far end modem (e.g., a data or voice signal) which may include echo attributable to the far end signal.

Echo canceller 200 may perform echo cancellation on sub-blocks. For example, a block may include multiple sub-blocks, where each sub-block includes one or more samples of a signal (e.g., near end signal or far end signal). The time duration of each sub-block may be the same. For example, samples may be based on a sample rate of 8 kilohertz (kHz), although other sample rates may be used. Echo canceller 200 may process the same time portion of one or more sub-blocks of the near end signal more than once without interrupting real-time audio reproduction of the near end signal. For example, the same time portion of the near end signal may be provided to each of controller 210, fixed filter 212, adaptive filter 214, and comfort noise generator 218.

Echo canceller 200 may be implemented as any or a combination of hardwired logic, software stored by a memory device and executed by a microprocessor, firmware, an application specific integrated circuit (ASIC), and/or a field programmable gate array (FPGA).

Controller 210 may receive a near end signal and far end signal. For example, controller 210 may receive the same time portion of the far end signal as that of the near end signal. Based on energy characteristics of the near and far end signals, controller 210 may determine whether the current time portion of the near end signal is to be processed by fixed filter 212 or adaptive filter 214, or no filtering is to be performed on the current time portion of the near end signal by fixed filter 212 or adaptive filter 214. Controller 210 may control whether the fixed filter 212 or adaptive filter 214 is to process the near end signal by use of respective ENABLE1 and ENABLE2 signals.

Coefficient storage 216 may store filter tap coefficients used by fixed filter 212 and adaptive filter 214. The coefficients may be initialized to zero. For example, adaptive filter 214 may store coefficients into and retrieve coefficients from coefficient storage 216. For example, fixed filter 212 may retrieve coefficients from coefficient memory 216. For example, adaptive filter 214 may provide coefficients to coefficient storage 216 for use by fixed filter 212.

Fixed filter 212 may perform finite impulse response (FIR) filtering relevant sub-blocks of the near end signal. The number of filter taps of fixed filter 212 may be based on a time to receive a reflected signal in response to a signal transmitted through a signal propagation medium. Fixed filter 212 may retrieve its filter tap coefficients from coefficient storage 216 and use the coefficients to process the near end signal.

Adaptive filter 214 may perform adaptive FIR filtering on the near end signal. Adaptive filter 214 may adjust filter tap coefficients every sample. Adaptive filter 214 may use a recursive normalized least mean square (LMS) algorithm to update coefficients based on processing of the near end signal. Adaptive filter 214 may track variations in the characteristics of the signal propagation medium. In one implementation, if MIPS (million instructions per second) speed is insufficient, adaptive filter 214 may process every other relevant sub-block of the near end signal. If MIPS speed is sufficient, then adaptive filter 214 may process every relevant sub-block of the near end signal. One implementation of adaptive filter 214 may include a background filter and foreground filter.

Figure 3:
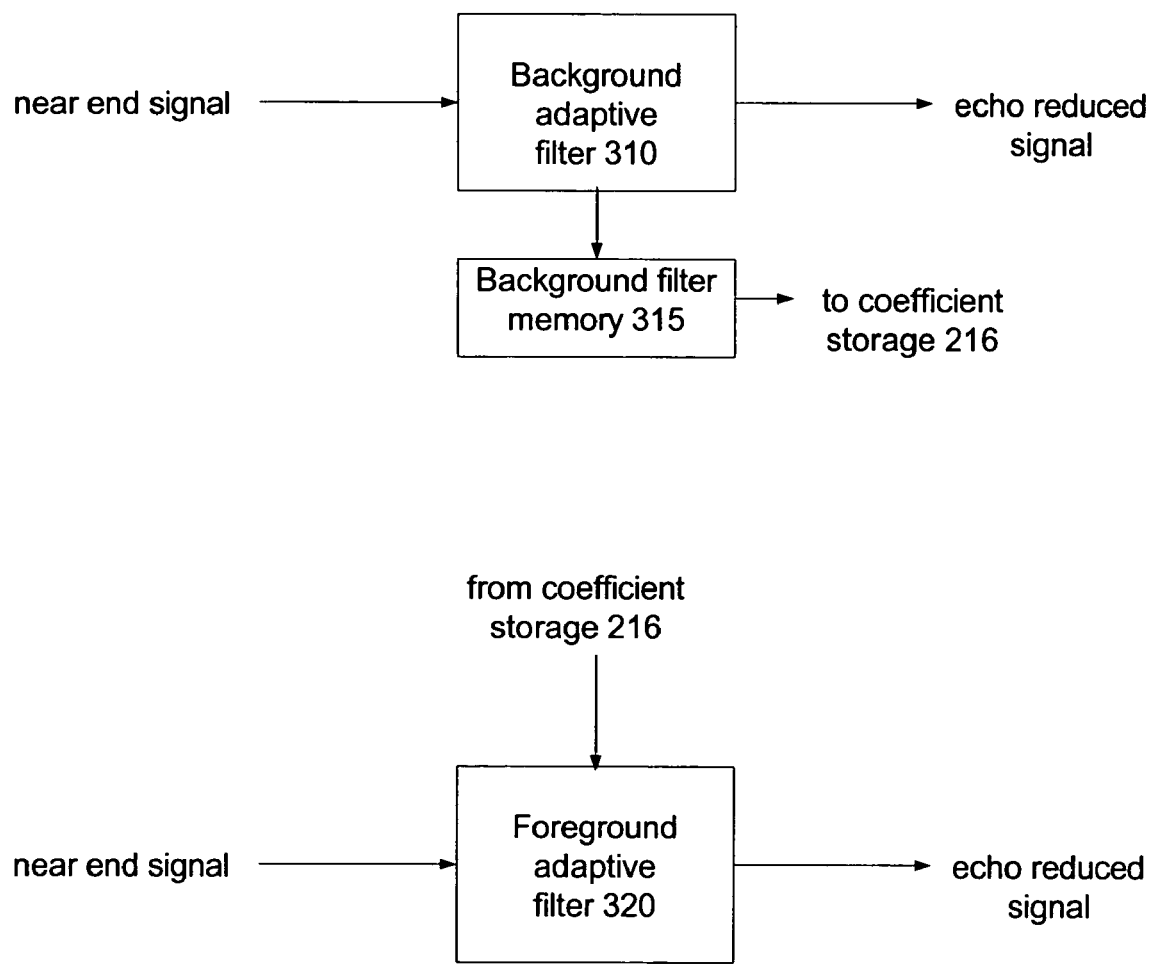
FIG. 3 depicts an example implementation of an adaptive filter in accordance with an embodiment of the present invention.

For example, FIG. 3 depicts one possible implementation of adaptive filter 214, but not the only possible implementation. One implementation of adaptive filter 214 includes background adaptive filter 310, background filter memory 315, and foreground adaptive filter 320. In one implementation, foreground adaptive filter 320 processes a current time portion of the near end signal and provides the output from adaptive filter 214. In one implementation, while foreground adaptive filter 320 processes and outputs a current time portion of the near end signal, background adaptive filter 310 processes the same time portion of the near end signal and updates coefficients using the LMS algorithm based on processing of the near end signal.

Foreground adaptive filter 320 may perform a simple FIR filtering technique on the near end signal. The number of filter taps of the foreground adaptive filter 320 may be based on a time to receive a reflected signal in response to a signal transmitted through a signal propagation medium. Foreground adaptive filter 320 may retrieve filter tap coefficients from coefficient storage 216 and use the coefficients to process the near end signal.

Background adaptive filter 310 may perform adaptive FIR filtering on the near end signal. In one implementation, background adaptive filter coefficients may be initialized to zero. Background adaptive filter 310 may adjust its filter tap coefficients every sample of the near end signal. Background adaptive filter 310 may use an LMS algorithm to update coefficients based on processing of the near end signal. Background adaptive filter 310 may store coefficients into background filter memory 315. Background filter memory 315 may store coefficients into coefficient storage 216. For example, foreground adaptive filter 320 may retrieve coefficients from coefficient storage 216 that may be provided by background filter memory 315.

Based on the noise present in the current time portion of the near end signal processed by fixed filter 212 or adaptive filter 214 or not processed by fixed filter 212 or adaptive filter 214, comfort noise generator 218 may replace such time portion of the near end signal with comfort noise. Comfort noise may be a similar noise level as that in the current time portion of the near end signal. The time portion of the near end signal provided by comfort noise generator 218 (whether replaced by comfort noise or not) may be provided for audible performance.

Figure 4:
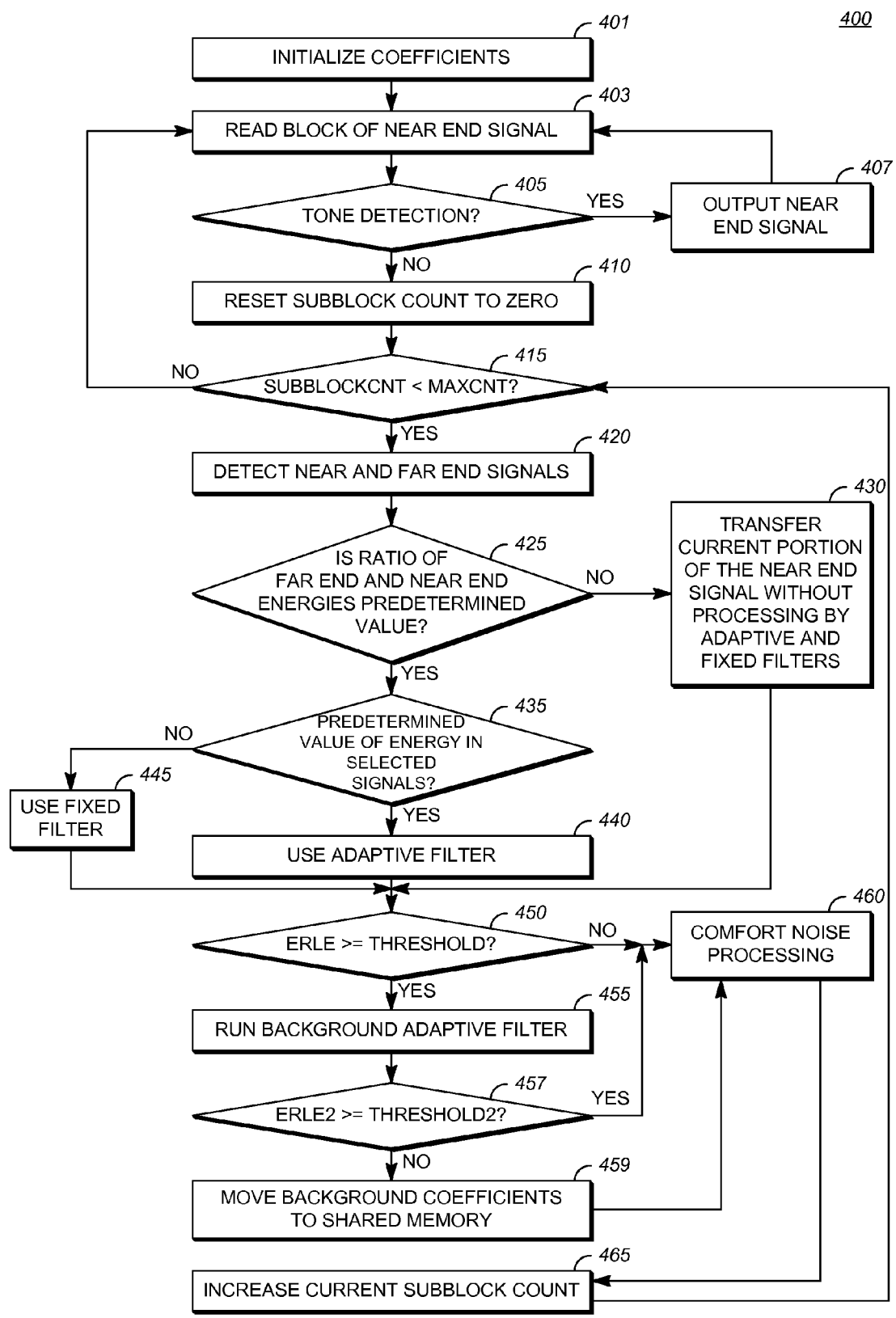
FIG. 4 depicts a process in accordance with an embodiment of the present invention.

FIG. 4 depicts an embodiment of the present invention in process 400. For example, an echo canceller may utilize the process 400 to reduce echo noise in near end signals. The echo canceller may utilize a fixed filter, adaptive filter, coefficient memory, and comfort noise generator. In one implementation, process 400 may process a same time portion of each of the near end and far end signals, where each portion is one or more subblocks.

Action 401 may include initializing coefficients used by the fixed filter and the adaptive filter to zero. Action 403 may include reading a block of the near end signal. A block may include multiple sub-blocks, where each sub-block includes one or more samples of the near end signal. Action 405 may include detecting an echo canceller disabling tone in the read portion of the near end signal (for example at 2.1 kHz) in compliance, for example, with ITU-T G.168 (2000). If an echo canceller disabling tone is detected, then action 407 may follow action 405. If an echo canceller disabling tone is not detected, then action 410 may follow action 405.

Action 407 may include transferring the block of the near end signal without echo cancellation processing. Action 403 may follow action 407.

Action 410 may include resetting a current subblock counter variable (variable SubBlockcnt) to zero. Action 415 may include determining whether the current subblock counter variable is within a range of subblocks numbered within a block (variable MaxCnt). If the current subblock counter variable is within a range of subblocks numbered within a block, then action 420 may follow action 415. If the current subblock counter variable is not within a range of subblocks numbered within a block, then action 403 may follow action 415.

Action 420 may include detecting energy levels of the current portion of the far end signal and the current portion of the near end signal. Action 425 may include determining whether a ratio of the current portion of the far end energy signal over the current portion of the near end signal energy is a predetermined value. If the ratio is not sufficiently high, then action 430 may follow action 425. If the ratio is a predetermined value, then action 435 may follow action 425.

Action 430 may include transferring the current portion of the near end signal without filtering by a fixed filter or adaptive filter. Action 450 may follow action 430.

Action 435 may include determining whether energy levels of the following signals each exceed the same or different threshold(s): (a) the current portion of the far end signal and (b) the current portion of the near end signal. Action 440 may follow action 435 if both (a) and (b) are a predetermined value. Action 445 may follow action 435 if either (a) or (b) is not not sufficiently high.

Action 440 may include using a foreground component of the adaptive filter to process the current portion of the near end signal. Action 450 may follow action 440.

Action 445 may include using the fixed filter to process the current portion of the near end signal. Action 450 may follow action 445.

Action 450 may include determining whether ERLE (defined below) is equal to or greater than a threshold. In action 450, ERLE may be defined as:

energy in current portion of near end signal/energy in the residual signal, where the residual signal is the echo cancelled near end signal (i.e., after processing in action 440 or 445) or the near end signal after transfer by action 430.

If the ERLE is equal to or greater than the threshold, then action 455 may follow action 450. If the ERLE is less than the threshold, then action 460 may follow action 450.

Action 455 may include determining filter tap coefficients by utilizing a background component of the adaptive filter to process the current portion of the near end signal (provided from action 430, 440, or 445) and allowing the background adaptive filter to adjust coefficients based on processing of such current portion of the near end signal. Action 457 may follow action 455.

Action 457 may include determining whether variable ERLE2 is equal to or greater than a threshold, where ERLE2 is defined as:

energy in current portion of near end signal/energy in current portion of near end signal after processing by background adaptive filter in action 455.

If the ERLE2 is equal to or greater than the threshold, then action 460 may follow action 457. If the ERLE2 is less than the threshold, then action 459 may follow action 457. For example, the threshold used in action 450 may be different from that used in action 457.

Action 459 may include storing filter tap coefficients determined after processing of the current portion of the near end signal by the background adaptive filter in action 455 to coefficient memory so that such coefficients may be used by the foreground adaptive filter (e.g., in a next operation of action 440) or the fixed filter (e.g., in a next operation of action 445). Action 460 may follow action 459.

Action 460 may include selectively replacing the current portion of the near end signal processed by either the adaptive filter (action 440) or fixed filter (action 445) or transferred without processing (action 430) with comfort noise based on energy level of the residual signal and energy level of the near end signal. The current portion of the near end signal transferred from action 460 may be audibly reproduced for example, by an audio speaker.

Action 465 may include increasing a current subblock count. Action 415 may follow action 465.

Modifications

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
   determining energies in selected portions of far and near end signals;
   selectively processing the selected portion of the near end signal using foreground adaptive coefficient filtering based on the selected portions of the far and near end signals;
   selectively processing the selected portion of the near end signal using fixed coefficient filtering based on the selected portions of the far and near end signals; and
   selectively transferring the selected portion of the near end signal without processing using foreground adaptive coefficient filtering and without processing using fixed coefficient filtering in response to a ratio of the selected portion of the far end energy signal over the selected portion of the near end signal energy not exceeding a predetermined value.

2. The method of claim 1, wherein the selectively processing the selected portion of the near end signal using foreground adaptive coefficient filtering is based on a first condition and wherein the first condition comprises (i) energy in the selected portion of the far end signal equaling or exceeding a first threshold and (ii) energy in the selected portion of the near end signal equaling or exceeding a second threshold and (iii) a ratio of the selected portion of the far end energy signal over the selected portion of the near end signal energy exceeding a predetermined value.

3. The method of claim 2, wherein the selectively processing the selected portion of the near end signal using fixed coefficient filtering is based on a second condition and wherein the second condition comprises the first condition not being met.

4. The method of claim 1, further comprising:
   selectively replacing the selected portion of the near end signal with comfort noise based in part on energy in the selected portion of near end signal and energy in the selected portion of near end signal after the transferring or prior applied processing.

5. The method of claim 1, further comprising:
   selectively applying background adaptive coefficient filtering of the selected portion of the near end signal based in part on energy in the selected portion of near end signal and energy in the selected portion of near end signal after the transferring or prior applied processing; and
   selectively storing coefficients of the background adaptive filtering into a shared memory based in part on energy of the selected portion of the near end signal and energy in the selected portion of the near end signal after background adaptive filtering.

6. The method of claim 5, further comprising:
   selectively replacing the selected portion of the near end signal with comfort noise based in part on energy in the selected portion of the near end signal and energy in the selected portion of the near end signal after the transferring or prior applied processing.

7. The method of claim 1, further comprising incrementing a current subblock counter.

8. The method of claim 1, wherein the selected portion comprises multiple samples.

9. The method of claim 1, wherein the selectively processing the selected portion of the near end signal using foreground adaptive coefficient filtering includes processing every other sub frame of the near end signal.

10. The method of claim 1, wherein the selectively applying background adaptive coefficient filtering of the selected portion of the near end signal includes processing every other sub frame of the near end signal.

11. An apparatus comprising:
    an adaptive filter to selectively process a selected portion of a near end signal based on selected portions of the far and near end signals;
    a fixed filter to selectively process the selected portion of the near end signal based on selected portions of the far and near end signals;
    a controller to control processing of the selected portion of the near end signal;
    a coefficient memory to store coefficients used by the fixed filter and the adaptive filter; and
    a comfort noise generator to selectively replace the selected portion of the near end signal with comfort noise, wherein the comfort noise generator is to selectively transfer the selected portion of the near end signal without processing using foreground adaptive coefficient filtering and without processing using fixed coefficient filtering in response to a ratio of the selected portion of the far end energy signal over the selected portion of the near end signal energy not exceeding a predetermined value.

12. The apparatus of claim 11, wherein the adaptive filter comprises a background filter which comprises an adaptive coefficient finite impulse response filter.

13. The apparatus of claim 12, wherein the background filter utilizes a recursive normalized least mean square algorithm to update coefficients based on processing of the near end signal.

14. The apparatus of claim 11, wherein the adaptive filter comprises a foreground filter which comprises a fixed coefficient finite impulse response filter.

15. The apparatus of claim 11, wherein the fixed filter comprises a fixed coefficient finite impulse response filter.

16. The apparatus of claim 11, wherein the comfort noise generator is to selectively replace the selected portion of the near end signal with comfort noise based in part on energy in the selected portion of the near end signal after the transferring or prior applied processing.

17. The apparatus of claim 11, wherein the comfort noise generator is to selectively transfer the transferred or processed selected portion of the near end signal based in part on energy in the selected portion of near end signal after the transferring or prior applied processing.

18. The apparatus of claim 11, wherein the portion comprises multiple samples.

19. The apparatus of claim 11, wherein the adaptive filter is to process every other subframe of the selected portion of the near end signal.

20. The apparatus of claim 11, wherein the adaptive filter comprises a background filter to selectively apply adaptive coefficient filtering of the selected portion of the near end signal.

21. The apparatus of claim 11, wherein the adaptive filter comprises a foreground filter to selectively apply fixed coefficient filtering of the selected portion of the near end signal and to provide the fixed coefficient filtered selected portion of the near end signal from the adaptive filter.

22. A system comprising:
- a speaker;
- a microphone;
- a signal processor comprising:
    - an adaptive filter to selectively process a selected portion of a near end signal based in part on energy in the near end signal and a far end signal,
    - a fixed filter to selectively process the selected portion of the near end signal based in part on energy in the near end signal and the far end signal,
    - a controller to control processing of the selected portion of the near end signal,
    - a coefficient memory to store coefficients used by the fixed filter and the adaptive filter, and
    - a comfort noise generator to selectively replace the selected portion of the near end signal with comfort noise, wherein the comfort noise generator is to selectively transfer the selected portion of the near end signal without processing using foreground adaptive coefficient filtering and without processing using fixed coefficient filtering in response to a ratio of the selected portion of the far end energy signal over the selected portion of the near end signal energy not exceeding a predetermined value; and
- an output device to provide the processed or transferred near end signal to the speaker.

23. The system of claim 22, wherein the adaptive filter comprises a background filter to selectively apply adaptive coefficient filtering of the selected portion of the near end signal.

24. The system of claim 22, wherein the adaptive filter comprises a foreground filter to selectively apply fixed coefficient filtering of the selected portion of the near end signal and to provide the fixed coefficient filtered selected portion of the near end signal from the adaptive filter.

* * * * *

UNITED STATES PATENT AND TRADEMARK OFFICE
CERTIFICATE OF CORRECTION

PATENT NO. : 7,349,353 B2 Page 1 of 1
APPLICATION NO. : 10/729177
DATED : March 25, 2008
INVENTOR(S) : Guduru et al.

It is certified that error appears in the above-identified patent and that said Letters Patent is hereby corrected as shown below:

In column 6, line 10, in Claim 9, delete "sub frame" and insert -- subframe --, therefor.

In column 6, line 14, in Claim 10, delete "sub frame" and insert -- subframe --, therefor.

Signed and Sealed this

Nineteenth Day of August, 2008

JON W. DUDAS
*Director of the United States Patent and Trademark Office*